United States Patent
Mori et al.

(10) Patent No.: US 6,707,766 B2
(45) Date of Patent: Mar. 16, 2004

(54) MAGNETO-OPTICAL STORAGE MEDIA

(75) Inventors: Go Mori, Nara (JP); Naoyasu Iketani, Tenri (JP); Michinobu Mieda, Shiki-gun (JP); Akira Takahashi, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 43 days.

(21) Appl. No.: 10/099,968

(22) Filed: Mar. 19, 2002

(65) Prior Publication Data

US 2002/0136097 A1 Sep. 26, 2002

Related U.S. Application Data

(62) Division of application No. 09/440,929, filed on Nov. 16, 1999, now Pat. No. 6,388,956.

(30) Foreign Application Priority Data

Nov. 27, 1998 (JP) ............................................. 10-337446

(51) Int. Cl.$^7$ ................................................ G11B 11/00
(52) U.S. Cl. ............................... 369/13.08; 369/13.43; 369/13.44; 428/694 EC
(58) Field of Search .......................... 369/13.43, 13.44, 369/13.4, 13.41, 13.42, 13.51, 13.05, 116, 288, 283, 275.2, 13.52, 13.53, 13.47, 13.02, 13.08, 13.07; 428/694 EC, 696 MC, 694 MM, 69.3

(56) References Cited

U.S. PATENT DOCUMENTS

| | | | |
|---|---|---|---|
| 5,790,513 A | * 8/1998 | Hiroki et al. ............ 369/275.2 |
| 5,926,444 A | 7/1999 | Hirokane et al. ......... 369/13.41 |
| 5,955,191 A | * 9/1999 | Hirokane et al. ............ 428/332 |
| 6,125,083 A | * 9/2000 | Nishimura et al. ....... 369/13.46 |
| 6,178,143 B1 | * 1/2001 | Hirokane et al. ......... 369/13.51 |
| 6,188,649 B1 | * 2/2001 | Birukawa et al. ......... 369/13.05 |
| 6,261,707 B1 | 7/2001 | Murakami et al. ... 428/694 ML |
| 6,307,819 B1 | * 10/2001 | Birukawa et al. ......... 369/13.07 |
| 6,338,911 B1 | 1/2002 | Mori et al. .......... 428/694 ML |

FOREIGN PATENT DOCUMENTS

| | | |
|---|---|---|
| JP | 6-290496 | 10/1994 |
| JP | 7-114750 | 5/1995 |

\* cited by examiner

*Primary Examiner*—Ali Neyzari
(74) *Attorney, Agent, or Firm*—Birch, Stewart, Kolasch & Birch, LLP

(57) ABSTRACT

A magneto-optical storage medium includes an interference layer, a magnetic domain expansion layer, an intermediate layer, a magnetic masking layer, a recording layer, and a protection layer which are sequentially formed on a substrate. The magnetic domain expansion layer produces a smaller frictional force due to wall coercivity than do the other magnetic layers. The intermediate layer has the Curie temperature $T_{C2}$ which is lower than those of the other magnetic layers. The magnetic masking layer is in a perpendicular magnetization state at temperatures that are in a proximity of $T_{C2}$, and changes into an in-plane magnetization state at temperatures that are higher than the proximity of $T_{C2}$. The recording layer produces a higher coercive force than those produced by the magnetic domain expansion layer at room temperature.

27 Claims, 5 Drawing Sheets

MAGNETO-OPTICAL STORAGE MEDIA

This a Request for filing a divisional application under 37 C.F.R. §1.53 (b) of prior application Ser. No. 09/440,929 filed on Nov. 16, 1999, now U.S. Pat. No. 6,388,956 the entire contents of which are hereby incorporated by reference.

FIELD OF THE INVENTION

The present invention refers to magneto-optical storage media for magneto-optically storing and reproducing information with a laser beam.

BACKGROUND OF THE INVENTION

Magneto-optical storage media, an application of magneto-optical effects, are increasing their storage density as a result of a variety of research and development projects to develop repeatedly rewritable information storage media with a large capacity.

The magneto-optical storage medium has a short-coming that reproduction properties deteriorate with a relative decrease in the diameter or interval of storage bits, which form magnetic domains for storage, to the diameter of the light beam focused on the medium.

This is because the diameter of the light beam focused on a target storage bit encompasses an adjacent storage bit, and the information stored on the individual storage bits cannot be separately reproduced.

To eliminate the short-coming, attempts have been made to improve storage density through working on the arrangement and reproduction technique of the storage medium. One of the proposed methods is an expanded magnetic domain reproduction system by means of displacement of magnetic walls.

Here, a reference is made to a prior art, Japanese Laid-Open Patent Application No. 6-290496/1994 (Tokukaihei 6-290496 published on Oct. 18, 1994; hereinafter will be referred to as Prior Art 1) disclosing an expanded magnetic domain reproduction technology by means of displacement of magnetic walls.

According to the technology, in a magneto-optical storage medium, high density storage is realized using reproduction signals having an increased amplitude, by coupling magnetic films that form a multi-layered structure through an exchange force, and increasing tiny storage magnetic domains in a recording layer 104 in size by means of a magnetic domain expansion layer 101. FIG. 7(a) shows such an arrangement. Note that arrows are drawn in some layers to denote the directions of sub-lattice magnetization of the transition metals composing the layers, and also that magnetic walls (Bloch walls) 110 are formed in the layers between such adjacent magnetic domains that the directions of their magnetization are different from each other by 180°. The layers in which no arrows are drawn are non-magnetic. Portions of the magnetic layers in which arrows are absent denote loss of ordered magnetization in them due to temperature elevated to the Curie temperature or even higher.

There are four principal requirements for the magneto-optical storage medium as follows:

1. The recording layer 104 should be provided so as to stably hold tiny magnetic domains in place at temperatures ranging from room temperature to temperatures reached during reproduction.

2. The recording layer 104, the intermediate layer 102, and the magnetic domain expansion layer 101 should be coupled through an exchange force at least in a proximity of the Curie temperature, $T_{C102}$, of the intermediate layer 102.

3. The intermediate layer 102 should lose ordered magnetization as its temperature rises past the Curie temperature $T_{C102}$, cutting off the exchange coupling among the recording layer 104, the intermediate layer 102, and the magnetic domain expansion layer 101 above the Curie temperature $T_{C102}$.

4. The magnetic domain expansion layer 101 should generate a low frictional force due to magnetic domain wall coercivity, and a temperature gradient should cause a magnetic wall energy gradient. Hence, the magnetic walls 110 move where the intermediate layer 102 functions so as to cut off the exchange coupling, with the portion to which magnetization is duplicated from a magnetic domain 104a in the recording layer 104 as an original. As a result, the magnetization in those regions become aligned to the same direction as that of the magnetic domain 104a.

FIG. 7(b) is a graph illustrating the distribution of temperature in the middle of a track of a disk moving to the right relative to the person observing as a result of projection of a laser beam to the magneto-optical storage medium. Here, the disk is moving at such a high linear velocity that temperature is highest downstream of the center of the beam spot with respect to the direction of the movement of the beam spot.

FIG. 7(c) is a graph illustrating the distribution of the magnetic wall energy density $\delta 101$ in the magnetic domain expansion layer 101 in a circumferential direction. Typically, the magnetic wall energy density decreases with an increase in temperature, dropping to 0 above the Curie temperature. Therefore, when there is a temperature gradient in a circumferential direction as shown in FIG. 7(b), the magnetic wall energy density $\delta 101$ decreases with high temperatures as shown in FIG. 7(c).

The force, $F_{101}$, exerted on the magnetic walls in the layers at position x along the circumference is given by the following expression:

$$F_{101} = -d\delta_{101}/dx$$

The force $F_{101}$ acts to move the magnetic walls to a lower magnetic wall energy level. The magnetic domain expansion layer 101, in comparison to the other magnetic layers, generates a low frictional force due to wall coercivity, i.e., is likely to allow movement of the magnetic walls. Therefore, when the exchange force is no longer available from the intermediate layer 102, the magnetic domain expansion layer 101 allows the force $F_{101}$ to move the magnetic walls to a lower magnetic wall energy level.

In FIG. 7(a), prior to the projection of a laser beam to the disk, the three magnetic layers are coupled through an exchange force where temperature is equivalent to room temperature, while the magnetic domains stored in the recording layer 104 have been duplicated to the magnetic domain expansion layer 101. Here, in each of the layers, there exist magnetic walls between such adjacent magnetic domains that have mutually reverse magnetization directions.

Where temperature has been raised to the Curie temperature, $T_{C102}$, of the intermediate layer 102 or higher, the intermediate layer 102 loses magnetization, cutting off the exchange coupling between the magnetic domain expansion layer 101 and the recording layer 104; therefore the magnetic domain expansion layer 101 can no longer hold the magnetic walls in place, allowing the magnetic walls to move toward a higher temperature portion according to the force $F_{101}$ exerted on the magnetic walls. Here, the magnetic walls move at a velocity sufficiently faster than does the medium. Therefore, the duplicate magnetic domains in the magnetic domain expansion layer 101 are larger in size than those stored in the recording layer 104.

However, the medium described in Prior Art 1 entails following problems: since the exchange coupling from the recording layer 104 through the magnetic domain expansion layer 101 is cut off where temperature has risen to the Curie temperature, $T_{C102}$, of the intermediate layer 102 or higher, the magnetic walls become movable in the magnetic domain expansion layer 101, whereas a parasitic magnetic field generated by the storage magnetic domains of the recording layer 104 builds up an unignorable magnetostatic coupling force.

The magnetostatic force arising from the magnetic fields generated by the other magnetic layers and the like, as well as that arising from the magnetic moments of those magnetic layers per se, is ignorably small in comparison to the exchange force, since an exchange force arises from exchange of electrons between magnetic layers at their interface. However, when the exchange coupling is cut off as in the above case, the magnetostatic coupling force is no longer ignorable. According to a super-resolution technology disclosed in Japanese Laid-Open Patent Application No. 10-40600/1998 (Tokukaihei 10-40600; published on Feb. 13, 1998), Japanese Laid-Open Patent Application No. 6-150418/1994 (Tokukaihei 6-150418; published on May 31, 1994), and other documents, the magnetization direction of the reproduction layer is caused to conform to the magnetization direction of the recording layer by the use of magnetostatic coupling with the recording layer.

In other words, in the medium arrangement described in Prior Art 1, a magnetostatic coupling force arises from the magnetic field generated by the recording layer 104 and exerted on the magnetic domain expansion layer 101 so that the magnetization direction of the magnetic domain expansion layer 101 aligns to the magnetization direction of the recording layer, interrupting movement of the magnetic walls in the magnetic domain expansion layer 101, presenting an obstacle in the expansion of the magnetic domains. An embodiment of Prior Art 1 suggests, as a solution, a method to attenuate the generated magnetic field by fabricating the magnetic layers from compensating compositions.

However, according to the method, since temperature in the beam spot does not have a uniform distribution, resulting in an uneven distribution of magnetization; consequently, a magnetic field is generated by the recording layer at least in some regions in the beam spot. In addition, in the embodiment of Prior Art 1, the intermediate layer 102, interposed between the recording layer 104 and the magnetic domain expansion layer 101, is relatively thin at about 10 nm. Therefore, the, magnetic domain expansion layer 101 is acted upon by the magnetic field generated by the recording layer 104 at a very short distance. The closer the magnetic domain expansion layer 101 is to the recording layer 104, the greater magnetostatic coupling force the magnetic domain expansion layer 101 experiences; adverse effects of the force, as a result, become increasingly unignorable, interrupting the movement of the magnetic walls in the magnetic domain expansion layer 101.

SUMMARY OF THE INVENTION

The present invention has an object to offer a magneto-optical storage medium that can suppress magnetic fields generated by a recording layer, realize satisfactory movement of magnetic walls and expansion of magnetic domains, and increase signal strength.

A magneto-optical storage medium in accordance with the present invention, in order to achieve the above object includes:
  a recording layer in which a plurality of storage magnetic domains are formed;
  a first intermediate layer for cutting off exchange coupling with the recording layer when temperature rises past a predetermined temperature;
  a magnetic domain expansion layer in which magnetic walls move toward a higher temperature portion so as to form expanded magnetic domains when the first intermediate layer cuts off the exchange coupling with the recording layer; and
  a magnetic masking layer, provided between the recording layer and the first intermediate layer, that is coupled with the recording layer through an exchange force at temperatures that are not higher than the predetermined temperature, and meanwhile cuts off magnetostatic coupling of the magnetic domain expansion layer with the recording layer at temperatures that are higher than the predetermined temperature.

With the arrangement, when temperature does not exceed the predetermined temperature, the recording layer, the magnetic masking layer, the first intermediate layer, and the magnetic domain expansion layer are coupled with each other through an exchange force, allowing the storage magnetic domains in the recording layer to be duplicated to the magnetic domain expansion layer. Meanwhile, as temperature rises past the predetermined temperature, the first intermediate layer cuts off the exchange coupling between the recording layer and the magnetic domain expansion layer, causing the magnetic domain expansion layer to lose magnetic order. As a result, the magnetic domain expansion layer can no longer hold the magnetic walls in place, allowing the magnetic walls to move toward a higher temperature portion with those magnetic domains that have been duplicated by the exchange coupling as an original. Hence, the duplicate magnetic domains expand toward a higher temperature portion, forming expanded magnetic domains in the magnetic domain expansion layer.

As temperature rises past the predetermined temperature, besides that the first intermediate layer cuts off the exchange coupling between the recording layer and the magnetic domain expansion layer as above, the magnetic masking layer cuts off the magnetostatic coupling between the recording layer and the magnetic domain expansion layer. This prevents the magnetic field (parasitic magnetic field) generated by the recording layer from acting on the magnetic domain expansion layer and thus presenting an obstacle to expansion of the magnetic domains at temperatures that are higher than the predetermined temperature; therefore, in the magnetic domain expansion layer, the magnetic walls move in a satisfactory fashion, forming expanded magnetic domains accurately and precisely.

The formation of the expanded magnetic domains increases reproduction signal strength; reproduction signals are now obtainable with a sufficiently large amplitude without being adversely affected by noise even if linear storage density is increased. As a result, the reliability of a reproduction operation increases dramatically.

For a fuller understanding of the nature and advantages of the invention, reference should be made to the ensuing detailed description taken in conjunction with the accompanying drawings.

DESCRIPTION OF THE EMBODIMENTS

First of all, referring to FIG. 1, principles of the present invention will be explained.

Figure 1:
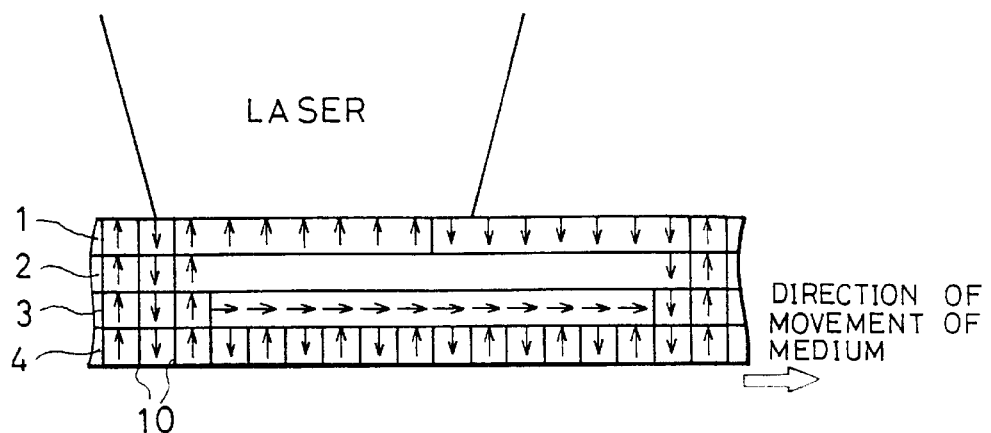
FIG. 1 is a drawing illustrating principles of a magneto-optical storage medium in accordance with the present invention.

FIG. 1 is a schematic cross-sectional view illustrating a magneto-optical storage medium in accordance with the present invention. The medium includes a first magnetic layer (magnetic domain expansion layer 1), a second magnetic layer (intermediate layer 2 or first intermediate layer), a third magnetic layer (masking layer 3 or magnetic masking layer), and a fourth magnetic layer (recording layer 4); the four layers are deposited sequentially in this order. Arrows are drawn in some layers to denote the directions of sub-lattice magnetization of the transition metals composing the layers, and magnetic walls (Bloch walls) 10 are formed in the layers between such adjacent magnetic domains that the directions of their magnetization are different from each other by 180°. Portions of the magnetic layers in which arrows are absent denote loss of ordered magnetization in them due to temperature elevated to the Curie temperature or even higher.

According to the present invention, the masking layer (magnetic masking layer) 3 is interposed between the recording layer 4 and the intermediate layer 2, which is a feature that cannot be found in conventional technologies. The magnetic masking layer 3 has magnetic properties adjusted, so that it changes into a perpendicular magnetization state at least in a proximity of the Curie temperature, $T_{c2}$) of the intermediate layer 2, establishing exchange coupling from the recording layer 4 through the magnetic domain expansion layer 1; and changes into an in-plane magnetization state at temperatures that are above the proximity of $T_{c2}$.

In the medium, in a proximity of $T_{c2}$, similarly to conventional technologies, the storage magnetic domains are duplicated from the recording layer 4 to the magnetic domain expansion layer 1 by an exchange force. Meanwhile, the masking layer 3 is in an in-plane magnetization state where temperature is equal to $T_{c2}$ or higher, thereby forming magnetic loops with the recording layer 4 and suppressing the occurrence of a magnetic field in a direction perpendicular to the surface of the layer. Consequently, adverse effects from a magnetostatic coupling force from the recording layer 4 through the magnetic domain expansion layer 1 can be reduced, removing the obstacle for movement of the magnetic walls.

Referring to the drawings, the following description will explain in detail specific embodiments in accordance with the present invention.

Embodiment 1

Figure 2:
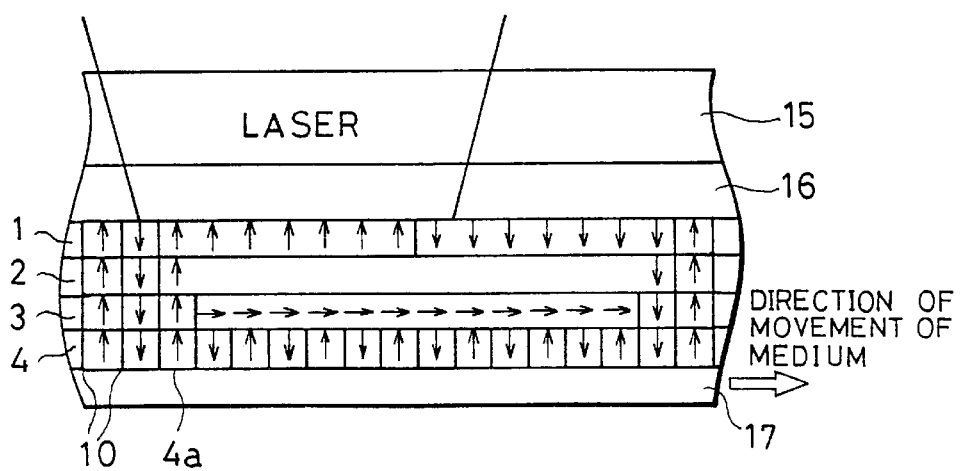
FIG. 2 is a schematic cross-sectional view illustrating an arrangement of a magneto-optical storage medium of embodiment 1.

FIG. 2 is a drawing illustrating an arrangement of a magneto-optical storage medium of the present embodiment. An interference layer 16, a first magnetic layer (magnetic domain expansion layer 1), a second magnetic layer (intermediate layer 2), a third magnetic layer (masking layer 3), a fourth magnetic layer (recording layer 4), and a protection layer 17 are formed sequentially on a transparent substrate 15.

The transparent substrate 15 may be made of glass, polycarbonate, norbornene resin, or the like. The layers constituting the magneto-optical storage medium can be deposited by, for example, continuous sputtering using a sputtering device, or vacuum deposition. Among others, the magnetic layers, 1, 2, 3, and 4 are formed successively while maintaining the vacuum to establish exchange coupling between them.

The interference layer 16 is provided so as to enhance magneto-optical effects and to protect the magnetic layers, and made of a transparent dielectric material, such as $Si_3N_4$, AlN, AlSiN, $SiO_2$, SiO, ZnS, and $MgF_2$. The same materials as those for the interference layer 16 can be used for the protection layer 17 which is provided to protect the magnetic layers. The interference layer 16 and the protection layer 17 do not play essential roles in the present invention, and their detailed description is therefore omitted here.

Further referring to FIG. 2, arrows are drawn in some layers to denote the directions of sub-lattice magnetization of the transition metals composing the layers, and magnetic walls (Bloch walls) 10 are formed in the layers between such adjacent magnetic domains that the directions of their magnetization are different from each other by 180°.

The recording layer 4 can be formed from a material that has a high perpendicular magnetic anisotropy and a coercive force and is suited to form tiny and stable storage bits, such as TbFeCo, DyFeCo, TbDyFeCo, and other rare-earth metal and transition metal amorphous alloys. Stored information is retained in the form of the upward or downward direction in the magnetic domains of the recording layer 4. Alternatively, the recording layer 4 may be fabricated from a perpendicular magnetization film of garnet, Pt/Co, Pd/Co, etc. and arranged so as to allow magnetic duplication of information to another layer. Note that at room temperature, the recording layer 4 has a higher coercive force than does the magnetic domain expansion layer 1.

The intermediate layer 2 is made of a rare-earth metal and transition metal amorphous alloy, similarly to the other magnetic layers, and is a perpendicular magnetization film having a Curie temperature $T_{c2}$ specified to about 70° C., lower than those of the other magnetic layers 1, 3, and 4. The intermediate layer 2 is coupled with the recording layer 4 through an exchange force at $T_{c2}$ or lower temperatures. The material for the intermediate layer 2 may be those having lower Curie temperatures among TbFeCo, TbDyFeCo, DyFeCo, TbFeAl, TbFeCoAl, TbDyFeAl, and DyFeAl, for example. If a magnetic attenuation element is to be used, Cu and other elements, as well as Al, may be used.

The magnetic domain expansion layer 1 is made of a rare-earth metal and transition metal amorphous alloy with a small perpendicular magnetic anisotropy, such as GdCo, GdFeCo, GdFe, NdGdFeCo, or a bubble memory material, such as garnet, so that in comparison to the other magnetic layers the magnetic domain expansion layer 1 produces a low frictional force due to wall coercivity, i.e., is likely to allow movement of the magnetic walls.

The masking layer 3 is made of a rare-earth metal and transition metal amorphous alloy; preferred examples include GdCo, GdFeCo, TbFeCo, DyFeCo, GdTbFeCo, GdDyFeCo, and TbDyFeCo. The masking layer 3 changes into a perpendicular magnetization state at least in a proximity of the Curie temperature, $T_{c2}$, of the intermediate layer 2 so as to be coupled with the recording layer 4 through an exchange force, and has magnetic properties such that it changes into an in-plane magnetization state at temperatures that are above the proximity of $T_{c2}$.

At temperatures that are in a proximity of the Curie temperature $T_{c2}$, the masking layer 3 is perpendicularly magnetized and therefore coupled with the other magnetic layer 1, 2, and 4 through an exchange force, allowing duplication of the storage magnetic domains in the recording layer 4 to the magnetic domain expansion layer 1. At temperatures that are above the proximity of $T_{c2}$, the masking layer 3 changes into an in-plane magnetization state, forms magnetic loops with the recording layer 4, and serves to substantially mask the parasitic magnetic field generated by the recording layer 4. Conventionally, without the masking layer 3, the parasitic magnetic field was existent. Moreover, to facilitate storage in the recording layer 4, the Curie temperature, $T_{c3}$, of the masking layer 3 is preferably specified to a lower value than the Curie temperature, $T_{c4}$, of the recording layer 4 ($T_{c3}<T_{c4}$).

Note in FIG. 2 that the arrows (directions of the transition metal sub-lattice magnetization) in regions of the masking layer 3 that are in an in-plane magnetization state point in the same in-plane direction. However, this is only for the purpose of easy identification of the in-plane magnetization state; in fact, the transition metal sub-lattice magnetization do not necessarily point the same directions, since it forms magnetic loops with some of the storage magnetic domains of the recording layer 4. In the present invention, the masking layer 3 is provided for a purpose of suppressing the magnetic field generated by the recording layer 4 by means of the formation of magnetic loops. The same holds true throughout the drawings for the embodiments 2, 3, and 4.

Further, the masking layer 3 needs to have the aforementioned magnetic properties only in the multilayered arrangement of the present embodiment, and may always be in-plane magnetized as a single layer.

As to the thicknesses of the layers, preferably, the interference layer 16 is about 70 nm, the magnetic domain expansion layer 1 about 30 nm, the intermediate layer 2 about 10 nm, the masking layer 3 about 20 nm, the recording layer 4 about 40 nm, and the protection layer 17 about 20 nm, for example. Note that the thickness of the interference layer 16 is determined so as to optimize multi-interference carried out with an evaluation device that is used in the present invention to conduct evaluation. The evaluation device produces a laser beam of 680 nm in wavelength. If a different wavelength is to be adopted, the thickness of the interference layer 16 needs to be adjusted so as to produce optimum results for that particular wavelength. The thicknesses introduced here are mere examples, and are by no means limited to any particular values provided that the present embodiment achieves its purposes as detailed here.

Further, thermal properties may be also adjusted by further adding a metallic layer made of, for example, Cu and an Al alloy, such as Al, AlTa, AlTi, or AlCr to the arrangement. Further, protective coating may be provided using polymer resin. Layers may be formed on substrates before combining the substrates together.

Next, the storage and reproduction operation of the magneto-optical storage medium of the present embodiment will be explained.

(Storage Operation)

A data signal is stored on the magneto-optical storage medium in accordance with the present invention during rotation of the medium, either by projecting a laser beam having such a power to raise the temperature of the recording layer 4 substantially to the Curie temperature $T_{c4}$ and simultaneously modulating an external magnetic field or by applying a magnetic field of a fixed direction and simultaneously modulating the laser power. In the latter case, storage magnetic domains can be formed of a size smaller than the beam spot diameter by adjusting the intensity of the laser beam so that only a predetermined region in a beam spot reaches $T_{c4}$. As a result, a signal having a shorter cycle than the diffraction limit of light can be stored.

(Reproduction Operation)

A signal is reproduced during rotation of the medium, by projecting a laser beam having such a power to raise the temperature of the magneto-optical storage medium to a predetermined temperature that is higher than the Curie temperature $T_{c2}$.

In FIG. 2, prior to the projection of a laser beam to the disk, the four magnetic layers are coupled together through an exchange force where temperature is equivalent to room temperature, while the magnetic domains stored in the recording layer 4 have been duplicated to the magnetic domain expansion layer 1. Here, in each of the layers, there exist magnetic walls 10 between such magnetic domains that have mutually reverse magnetization directions.

Where temperature has been raised to the Curie temperature, $T_{c2}$, of the intermediate layer 2 or higher as a result of the projection of a laser beam, the intermediate layer 2 loses magnetization, and the exchange coupling is cut off between the magnetic domain expansion layer 1 and the recording layer 4; therefore, the magnetic domain expansion layer 1 can no longer hold the magnetic walls in place, allowing the magnetic walls to move toward a higher temperature portion according to the force $F_1$ exerted on the magnetic walls, which corresponds to the force $F_{101}$ in an aforementioned conventional example. Here, the masking layer 3 is in an in-plane magnetization state where temperature is equal to $T_{c2}$ or higher, thereby forming magnetic loops with the recording layer 4 and suppressing the generation of a magnetic field by the recording layer 4.

Hence, the magnetostatic coupling established by the recording layer 4 through the magnetic domain expansion layer 1 can be cut off. As a result, the magnetic walls are released from the grip by a magnetostatic force, as well as from the grip by an exchange force, and can move more smoothly.

Here, the magnetic walls move at a velocity sufficiently faster than does the medium. Therefore, the duplicate magnetic domains in the magnetic domain expansion layer 1 are larger in size than those stored in the recording layer 4.

As mentioned above, in the case of using a magneto-optical storage medium in accordance with the present invention, a magnetic domain 4a, found near the front edge of the beam spot, that has a temperature in a proximity of $T_{c2}$ can be expanded in the beam spot and duplicated for reproduction, enabling reproduction using reproduction signals of a large amplitude; therefore, reproduction signals can be produced with a sufficiently large amplitude without being affected by optical diffraction limit even if linear storage density is increased.

In the description so far on the movement of the magnetic walls, attention has been paid to the middle part of the track and its cross sections; however, since the actual track has a fixed width and a temperature gradient along the disk radius, we should also consider movement of the magnetic walls in such directions. Specifically, we should consider restraining crosstalk, i.e., signal interference, which increases with the movement of the magnetic walls along the disk radius and the resultant expansion of storage magnetic domains in an adjacent track. To do so, the movement of the magnetic walls needs to be restricted at the boundary between tracks.

This is done by a technique to modify the rectangle guide trench on the substrate, which are typically used to identify tracks of the magneto-optical storage medium, so that they are deeper than conventional ones, for example, about 100 nm or even deeper. Another technique is to store and reproduce information on the land which serves as an information track and separate the tracks by grooves.

According to the technique, the groove separates magnetic layers deposited on the land as well. Alternatively, information is stored and reproduced on the groove which serves as an information track, and the tracks are separated by lands. Further, information may be stored and reproduced on both the land and the groove, and the tracks are separated by guide trench boundaries, i.e., stepped portions. In practice, deposition takes place a little at the stepped portions to form a film linking magnetic layers; the film, however, is extremely thin compared to other parts, and the magnetic coupling at the stepped portions of the guide trench is ignorable.

A further alternative, when the substrate has a U-shaped guide trench, is to subject the portion of a magnetic layer corresponding to the guide trench to annealing by means of projection of a high powered laser so as to alter magnetic properties into in-plane magnetization, and hence magnetically separate tracks from adjacent ones.

Provided that the track is magnetically separated from adjacent ones as above, even if the storage magnetic domain is expanded to cover the whole width of the track, the magnetic wall does not move crossing the boundaries with adjacent tracks; consequently, along the circumference of the disk, the storage magnetic domain is only expanded not exceeding the width of a single track. Crosstalk (signal interference) from the storage magnetic domains in adjacent tracks can be thus eliminated. In addition, since no magnetic walls emerge or vanish at the boundaries with adjacent tracks, the magnetic walls can readily move along the track.

Further, the magnetic wall can move smoothly if after the formation of the interference layer 16 in manufacture of the magneto-optical storage medium in accordance with the present invention, the surface of the layer is smoothed by means of heating through the projection of Ar ions or by means of a sputtering etching process. This further increases the linear velocity of the medium.

Results from a measurement of properties of the magneto-optical storage medium explained in the present embodiment 1 are presented in the following.

A medium was fabricated as an example 1, such that the interference layer 16=70 nm, AlN; the magnetic domain expansion layer 1=30 nm, GdFeCo (Curie temperature $T_{C1}$>300° C.); the intermediate layer 2=10 nm, TbFeCo ($T_{C2}$=70° C.); the masking layer 3=20 nm, GdFeCo ($T_{C3}$=200° C.); the recording layer 4=40 nm, TbFeCo ($T_{C4}$=230° C.); and the protection layer 17=20 nm, AlN.

Further, for comparative purposes, another medium was fabricated with no masking layer included, as a comparative example 1, such that the interference layer 16=70 nm, AlN; the magnetic domain expansion layer 1=30 nm, GdFeCo ($T_{C1}$>300° C.); the intermediate layer 2=10 nm, TbFeCo ($T_{C2}$=70° C.); the recording layer 4=40 nm, TbFeCo ($T_{C4}$=230° C.), and the protection layer 17=20 nm, AlN.

The evaluation was conducted using an evaluation device that produces a laser beam of 680 nm in wavelength.

Figure 3:
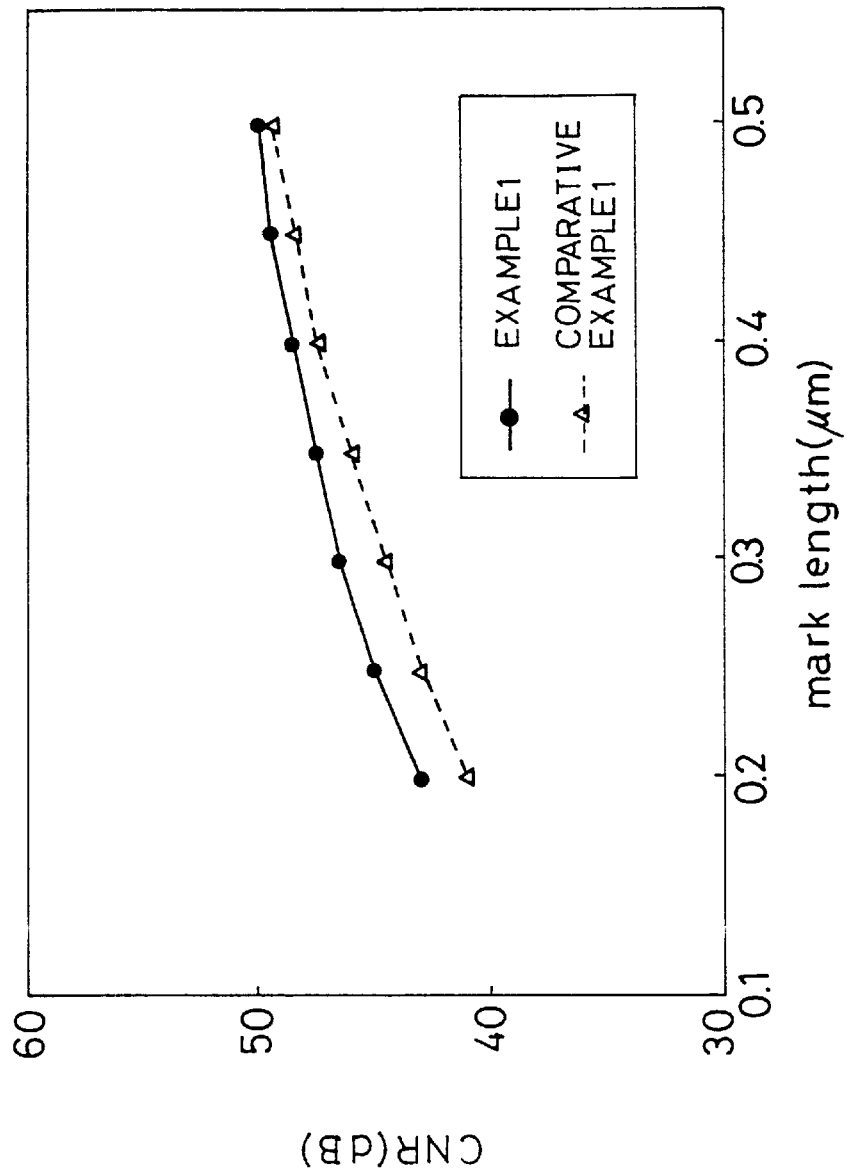
FIG. 3 is a drawing showing results from evaluation of reproduction properties of the magneto-optical storage medium of embodiment 1.

First of all, mark length dependency was measured on the example 1 and the comparative example 1 to evaluate the expansion and reproduction of magnetic domains. The CNR mark length dependency here represents the signal-to-noise ratio (C/N ratio) when a storage magnetic domains are successively formed of a length that corresponds to a mark length, with a storage magnetic domain pitch being equal to double the mark length. The length of the storage magnetic domains was altered from 0.5 μm to 0.2 μm (FIG. 3). The graph shows that storage magnetic domains, each 0.2 μm long, could produce a reproduction property of about 40 dB.

Accordingly, samples fabricated including a masking layer 3 of a thickness varying from 0 nm to 100 nm were evaluated. Results from the evaluation of signal properties on storage magnetic domains of 0.2 μm are shown in Table 1.

As understood from Table 1, in comparison to the comparative example 1, the example 1 increased the maximum value of C/N by about 2.0 dB, and expanded the tolerable range of reproduction power to produce a C/N ratio of 40 dB or greater by about 5%. Further, better reproduction signal properties than in conventional cases could be obtained with masking layers 3 with thicknesses up to 60 nm.

This is presumably for the following reasons: (1) The magnetostatic coupling between the recording layer 4 and the magnetic domain expansion layer 1 could be cut off by the masking layer 3 in the example 1, whereas the coupling could not be cut off in the comparative example 1; therefore the magnetic walls in the magnetic domain expansion layer 1 moved more smoothly in the example 1. (2) Since temperature distribution conditions became less demanding in enabling the magnetic walls to move, the maximum value of C/N rose, and the tolerable range of reproduction power could be expanded. In other words, even higher density was achievable without altering the conditions.

TABLE 1

| Thickness of Masking Layer 3 | C/N (dB) | Remarks |
| --- | --- | --- |
| 0 | 41.0 | Comparative Example 1 |
| 10 | 42.0 | |
| 20 | 43.0 | Example 1 |
| 30 | 43.0 | |
| 60 | 41.5 | |
| 100 | 28.0 | |

Note in the present embodiment 1 that since the Curie temperature, $T_{C3}$, of the masking layer 3 was set lower than the Curie temperature, $T_{C4}$, of the recording layer 4 ($T_{C3}$<$T_{C4}$), storage sensitivity in a storage operation did not deteriorate in comparison to the comparative example 1, and similar storage properties could be obtained. This is because the temperature of the medium reached a proximity of $T_{C4}$ and caused the masking layer 3 to lose ordered magnetization while data was being stored, and therefore the ordered magnetization did not present an obstacle in storing data by means of magnetization inversion.

Embodiment 2

Figure 4:
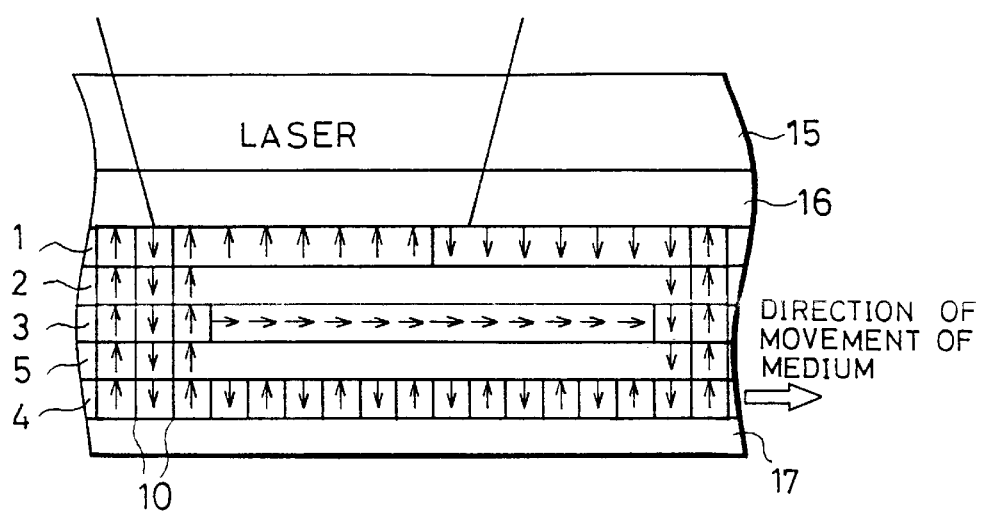
FIG. 4 is a schematic cross-sectional view illustrating an arrangement of a magneto-optical storage medium of embodiment 2.

FIG. 4 is a schematic cross-sectional view of a magneto-optical storage medium of the embodiment 2 in accordance with the present invention.

In the present embodiment 2, the same arrangement as that in the embodiment 1 is employed except that a fifth magnetic layer (second intermediate layer 5) is interposed between the masking layer 3 and the recording layer 4. To avoid confusion, the intermediate layer 2 described in the embodiment 1 will be renamed and referred to as the first intermediate layer 2.

The second intermediate layer 5 has magnetic properties similar to those of the first intermediate layer 2, and made of material similar to that for the first intermediate layer 2. Employment of a common material would contribute to an increase in efficiency in layer formation; however, different materials may be used provided that the purposes laid out below are achievable. In the present embodiment 2, both the first intermediate layer 2 and the second intermediate layer 5=10 nm, TbFeCo.

Similarly to the first intermediate layer 2 already discussed in the embodiment 1, the second intermediate layer 5 establishes the exchange coupling from the recording layer 4 through the masking layer 3, and has a Curie temperature $T_{C5}$ which is substantially equal to $T_{C2}$. If the medium incorporates this arrangement, storage magnetic domains can be duplicated from the recording layer 4 to the magnetic domain expansion layer 1 by means of the exchange coupling at temperatures that do not exceed $T_{C2}$, and magnetostatic coupling can be suppressed by the masking layer 3 at regions where temperature is $T_{C2}$ or higher. Further, the magnetic loops formed by the recording layer 4 and the masking layer 3 at regions where temperature is $T_{C2}$ or higher become magnetostatic through the interposition of the second intermediate layer 5 that has lost ordered magnetization, and the magnetic field generated by the recording layer 4 are caused to form loops and hence suppressed.

There are more advantages: if the Curie temperature, $T_{C3}$, of the masking layer 3 is set higher than the Curie temperature, $T_{C4}$, of the recording layer 4 ($T_{C3} > T_{C4}$), the masking layer 3 still retains ordered magnetization when data is being stored (temperature is in a proximity of $T_{C4}$ or higher); however, since the recording layer 4 and the masking layer 3 sandwich the second intermediate layer 5 which has lost ordered magnetization, the recording layer 4 neither is coupled with the masking layer 3 through an exchange force nor is adversely affected by the masking layer 3, enabling data to be stored with a weak storage magnetic field. In other words, there are less restrictions imposed on the Curie temperature, $T_{C3}$, of the masking layer 3, which allows more freedom in the design of the media. Specifically, raising the Curie temperature $T_{C3}$ increases the magnitude of the in-plane magnetization of the masking layer 3, better suppresses a magnetostatic coupling force, and realizes mask effects.

Note that the Curie temperature, $T_{C5}$ of the second intermediate layer 5 is set substantially equal to $T_{C2}$ in the present the embodiment 2; however, if an improvement in storage sensitivity is all that is required, the Curie temperature, $T_{C5}$, of the second intermediate layer 5 only needs to be lower than the Curie temperature, $T_{C4}$, of the recording layer 4 so that the second intermediate layer 5 loses ordered magnetization at a storing temperatures in a proximity of $T_{C4}$.

The following description will present results from a measurement of properties of the magneto-optical storage medium discussed in the present the embodiment 2.

A medium was fabricated as an example 2, such that the interference layer 16=70 nm, AlN; the magnetic domain expansion layer 1=30 nm, GdFeCo ($T_{C1} > 300°$ C.); the first intermediate layer 2=10 nm, TbFeCo ($T_{C2}=70°$ C.); the masking layer 3=20 nm, GdFeCo ($T_{C3}=200°$ C.); the second intermediate layer 5=10 nm, TbFeCo ($T_{C5}=70°$ C.); the recording layer 4=40 nm, TbFeCo ($T_{C4}=230°$ C.); and the protection layer 17=20 nm, AlN. Further, another medium was fabricated according to the same arrangement, including a second intermediate layer 5 of a varying thickness. Results from the evaluation of signal properties with storage magnetic domains of 0.2 μm are shown in Table 2 in the same manner as in the embodiment 1.

As understood from Table 2, in comparison to the comparative example 1, the example 2 increased the maximum value of C/N by about 3.0 dB, and expanded the tolerable range of reproduction power to produce a C/N ratio of 40 dB or greater by about 5%. Further, better reproduction signal properties than in conventional cases could be obtained with second intermediate layers 5 with thicknesses up to 60 nm.

TABLE 2

| Thickness of Second Intermediate layer 5 (nm) | C/N (dB) | Remarks |
| --- | --- | --- |
| 0 | 41.0 | Comparative Example 1 (No masking layer) |
| 0 | 43.0 | Example 1 (No Second Intermediate Layer) |
| 10 | 44.0 | Example 2 |
| 30 | 43.5 | |
| 50 | 41.5 | |
| 100 | 27.0 | |

This is presumably for the following reasons: (1) The magentostatic coupling between the recording layer 4 and the magnetic domain expansion layer 1 could be cut off in the example 2, whereas the coupling could not be cut off in the comparative example 1; therefore the magnetic walls in the magnetic domain expansion layer 1 moved more smoothly in the example 2. (2) Since the Curie temperature, $T_{C3}$, of the masking layer 3 can be set high even in comparison to the example 1, magnetization is great, and strong mask effects could be obtained. Therefore, the maximum value of C/N rose as mentioned earlier, as well as temperature distribution conditions became somewhat less demanding in enabling the magnetic walls to move; as a result, the tolerable range of reproduction power could be expanded.

As discussed above, with the arrangement of the embodiment 2, more satisfactory properties could be obtained, and even higher density was achievable.

Embodiment 3

Figure 5:
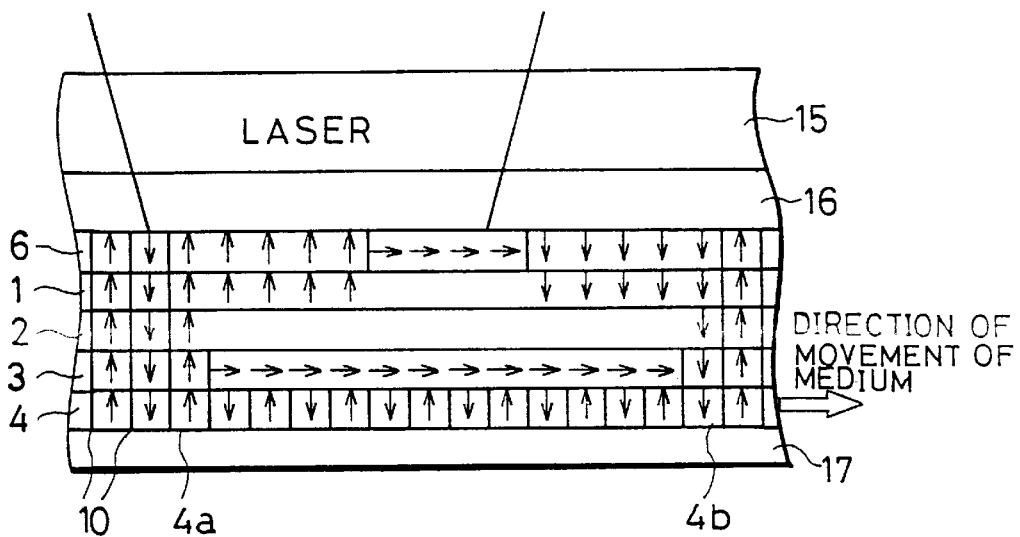
FIG. 5 is a schematic cross-sectional view illustrating an arrangement of a magneto-optical storage medium of embodiment 3.

FIG. 5 is a schematic cross-sectional view showing a magneto-optical storage medium of the embodiment 3 in accordance with the present invention.

In the present embodiment 3, the same arrangement as that in the embodiment 1 is employed except that a reproduction layer 6 that is coupled with the magnetic domain expansion layer 1 through an exchange force is provided on the light entering side of the magnetic domain expansion layer 1. Specifically, a medium was fabricated such that the interference layer 16=70 nm, AlN; the reproduction layer 6=20 nm, GdFeCo (Curie temperature $T_{C6} > 300°$ C.); the magnetic domain expansion layer 1=30 nm, GdFeCo (Curie temperature $T_{C1} > 160°$ C.); the intermediate layer 2=10 nm, TbFeCo ($T_{C2}=70°$ C.); the masking layer 3=20 nm, GdFeCo ($T_{C3}$=200° C.); the recording layer 4=40 nm, TbFeCo ($T_{C4}$=230° C.); and the protection layer 17=20 nm, AlN.

The reproduction layer 6 is preferably made of a material that produces a large Kerr rotation angle during reproduction and, that, for this purpose among others, has a high Curie temperature $T_{C6}$. Specifically, to obtain better reproduction signal properties than those of the magnetic domain expansion layer 1, the reproduction layer 6=20 nm, GdFeCo ($T_{C6}$>300° C., $T_{C6}$>$T_{C1}$) in the present embodiment 3; however, other materials may be used provided that the purposes laid out below are achievable.

As a magnetic property of the magnetic domain expansion layer 1, the Curie temperature $T_{C1}$ is set lower than a maximum temperature reachable during reproduction so that the magnetic domain expansion layer 1 loses ordered magnetization in a proximity of that highest temperature during reproduction. As for magnetic properties of the reproduction layer 6, the reproduction layer 6 is magnetized in the same magnetization direction as the magnetic domain expansion layer 1 by exchange coupling when the magnetic domain expansion layer 1 has ordered magnetization, and is in an in-plane magnetization state in regions where the magnetic domain expansion layer 1 has lost ordered magnetization. Note that the reproduction layer 6 needs to have those magnetic properties only when the magnetic layers are stacked, and the reproduction layer 6, as a single layer, may always be in an in-plane magnetization state.

The present arrangement offers the following advantages.

As already mentioned in the embodiments 1 and 2, the masking layer 3 is able to suppress the magnetic field generated by the recording layer 4, allowing smooth movement of the magnetic walls in the magnetic domain expansion layer 1. Further, when the magnetic domain expansion layer 1 expands the magnetic domains, those magnetic domains having temperatures that are in a proximity of the Curie temperature, $T_{C2}$, of the intermediate layer 2 are expanded; those points in a single track that have temperature equal to $T_{C2}$ exist both at the front end, 4a, of the beam spot (the back end when viewed from the medium) and at the rear end, 4b, thereof (the front end when viewed from the medium), and the magnetic walls move from those ends toward a higher temperature portion.

In such an event, since the magnetic domain expansion layer 1 is specified to lose ordered magnetization in regions where temperature is in a proximity of the maximum temperature, not all the duplicate expanded magnetic domains in the reproduction layer 6 are found in the beam spot; only the duplicate expanded magnetic domain at the front end of the beam spot is found in the beam spot. That is, only a certain single storage magnetic domain in the beam spot can be always expanded and duplicated for data retrieval during reproduction.

Moreover, in regions where the magnetic domain expansion layer 1 has a temperature equal to, or higher than, $T_{C1}$ and therefore has lost magnetization, the reproduction layer 6 is in an in-plane magnetization state, and masks magneto-optical signals; therefore, noise undesirable for reproduction is masked.

Further, since the reproduction layer 6 is specified to have a great Kerr rotation angle, high quality magneto-optical signals can be reproduced. In addition, since data is not directly reproduced from the magnetic domain expansion layer 1, those materials that produce a large Kerr rotation angle are not necessarily used, the Curie temperature is not necessarily set high, and media can be freely designed with a low frictional force due to wall coercivity.

The following description will present results from a measurement of properties of the magneto-optical storage medium discussed in the present the embodiment 3.

A medium was fabricated as an example 3, such that the interference layer 16=70 nm, AlN; the reproduction layer 6=20 nm, GdFeCo ($T_{C6}$>300° C.); the magnetic domain expansion layer 1=30 nm, GdFeCo ($T_{C1}$>160° C.); the first intermediate layer 2=10 nm, TbFeCo ($T_{C2}$=70° C.); the masking layer 3=20 nm, GdFeCo ($T_{C3}$=200° C.); the recording layer 4=40 nm, TbFeCo ($T_{C4}$=230° C.); and the protection layer 17=20 nm, AlN.

Results from an evaluation similar to those in the embodiments 1 and 2 show that in comparison to the comparative example 1, the example 3 increased the maximum value of C/N by about 4 dB, and expanded the tolerable range of reproduction power to produce a C/N ratio of 40 dB or greater by about 10%. Therefore, according to the example 3, even higher density was achievable.

This is presumably for the following reasons: (1) The magnetostatic coupling between the recording layer 4 and the magnetic domain expansion layer 1 could be cut off in the example 3, whereas the coupling could not be cut off in the comparative example 1; therefore, the magnetic walls in the magnetic domain expansion layer 1 moved more smoothly in the example 3. (2) Since the magnetic domain expansion layer 1 was not necessarily made of a material that produced large magneto-optical effects even in comparison to the example 1, the Curie temperature $T_{C1}$ was not necessarily set high. In other words, such materials could be used that the frictional force due to wall coercivity was small and the magnetic walls readily moved, facilitating expansion of the magnetic domains. (3) Since the reproduction layer 6 produced great magneto-optical effects, enabled its Curie temperature $T_{C6}$ to be set high, and allowed for choices in materials of which the reproduction layer 6 was made; therefore, excellent signal properties were obtainable.

Note, especially in the present embodiment 3, that the Curie temperature, $T_{C3}$, of the masking layer 3 is set higher than the Curie temperature, $T_{C1}$, of the magnetic domain expansion layer 1. That is, since the magnetic domain expansion layer 1 is magnetized and the masking layer 3 is in an in-plane magnetization state in all the regions where the magnetic walls can move, it is ensured that the magnetostatic coupling to the magnetic domain expansion layer 1 can be suppressed.

Further, the scope of the present invention is by no means restricted to the medium arrangement discussed in the embodiment 3. For example, the same effects as those with the embodiment 2 can be obtained with a medium arrangement incorporating the medium arrangement discussed in the embodiment 3 and further incorporating a second intermediate layer 5 interposed between a recording layer 4 and a masking layer 3 as discussed in the embodiment 2.

Embodiment 4

Figure 6:
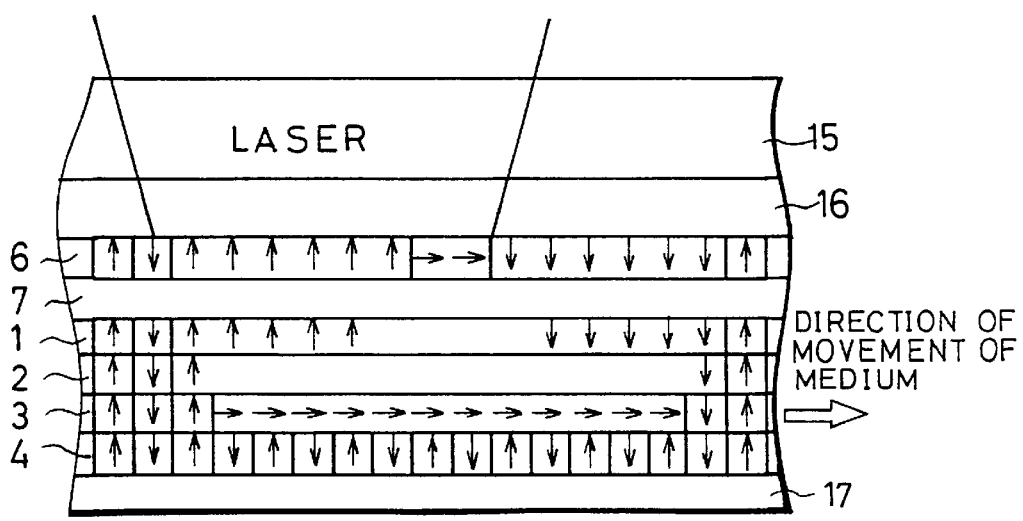
FIG. 6 is a schematic cross-sectional view illustrating an arrangement of a magneto-optical storage medium of embodiment 4.
Figure 7A:
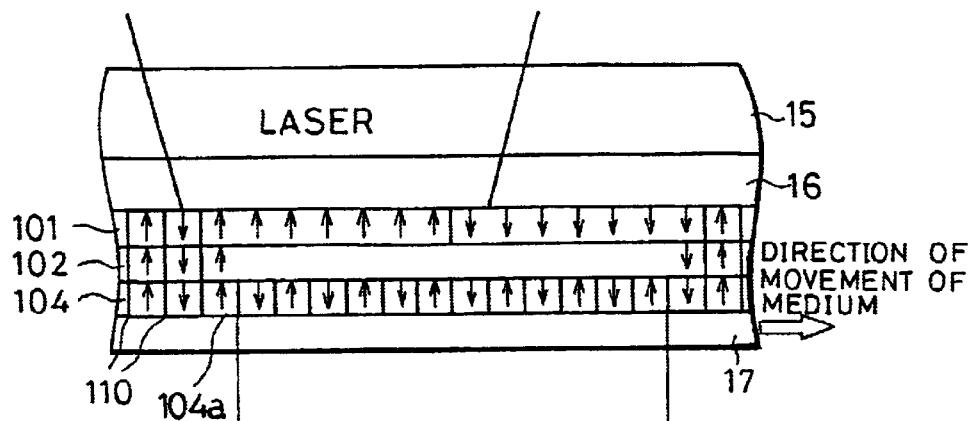
FIG. 7(a) to FIG. 7(c) are drawings illustrating reproduction principles of a conventional magneto-optical storage medium using a magnetic domain expansion technique of a magnetic wall moving type.
Figure 7B:
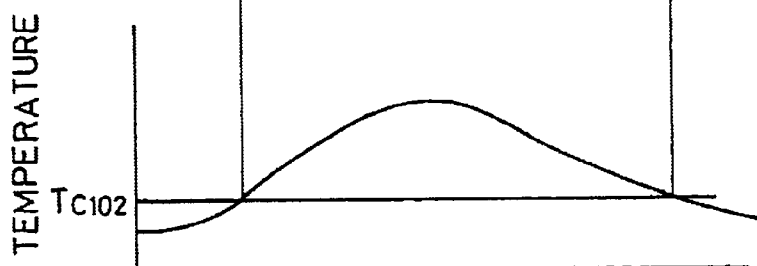
Figure 7C:
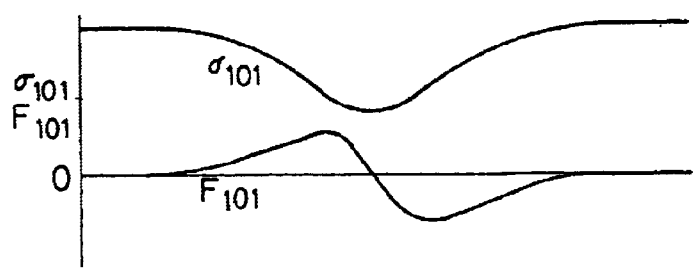

FIG. 6 is a schematic cross-sectional view of a magneto-optical storage medium of the embodiment 4 in accordance with the present invention.

In the present embodiment 4, the same arrangement as that in the embodiment 3 is employed except that a second interference layer (transparent dielectric layer 7) is interposed between the magnetic domain expansion layer 1 and the reproduction layer 6. The transparent dielectric layer 7 has a light transmitivity similar to that of the interference layer 16, and can be made of a material similar to that for the interference layer 16 discussed earlier. Employment of a common material would contribute to an increase in efficiency in layer formation; however, different materials may be used provided that the purposes laid out below are achievable. In the present embodiment 4, the interference layer 16=70 nm, AlN; and the transparent dielectric layer 7=20 nm, AlN.

The following description will explain roles of the transparent dielectric layer 7.

In FIG. 6, the transparent dielectric layer 7 cuts off the exchange coupling between the magnetic domain expansion layer 1 and the reproduction layer 6, establishing magnetostatic coupling instead. As already mentioned, as expanded magnetic domains are duplicated to the magnetic domain expansion layer 1, magnetization aligns to the same direction and causes a magnetic field to occur, which develops into a magnetostatic coupling magnetic field acting on the reproduction layer 6.

The reproduction layer 6 is in a perpendicular magnetization state at room temperature, and changes into an in-plane magnetization state above a certain temperature. Therefore, the reproduction layer 6 is in an in-plane magnetization state and produces no magneto-optical signals in regions where temperature is increased by a reproduction beam, which is an opposite of conventional magnetostatic-coupling-type-super-resolution systems. In the case of the system of the present embodiment, tiny storage magnetic domains are not duplicated for retrieval; instead, those magnetic domains that are already expanded and duplicated to the magnetic domain expansion layer 1 are duplicated for retrieval by means of magnetostatic coupling. Therefore, perpendicular magnetization regions in the reproduction layer 6 can be provided in large size.

In other words, in a conventional magnetostatic-coupling-type super-resolution medium, tiny magnetic domains need to be duplicated by means of magnetostatic coupling without changing their size, while masking surrounding magnetic domains; therefore, perpendicular magnetization needs to be controlled so as to cover a tiny area. In contrast, in a medium in accordance with the present invention, those magnetic domains that are expanded and duplicated are further duplicated; therefore perpendicular magnetization regions in the reproduction layer 6 do not need to be provided in a confined area.

In other words, since expanded magnetic domains can be duplicated to the reproduction layer 6, reproduction signals are obtainable with a large amplitude.

Moreover, in a conventional magnetostatic-coupling-type super-resolution medium, very small magnetic fields generated by tiny magnetic domains are used to realize magnetostatic coupling; therefore the recording layer and the reproduction layer need to be located as close to each other as possible without establishing exchange coupling. However, in the arrangement in accordance with the present invention, large magnetic fields generated by the magnetic domains that are already expanded in the magnetic domain expansion layer 1 are used for the duplication to the reproduction layer 6, allowing the thickness of the transparent dielectric layer 7 to be set to a somewhat large value. This enables use of both Kerr and Faraday effects of the reproduction layer 6, and optimization of multi-interference of light so as to obtain reproduction signals with a large amplitude.

It is earlier mentioned that the reproduction layer 6 and the magnetic domain expansion layer 1 have the same magnetization direction as a result of magnetostatic coupling. Accordingly, if the polarity of the sub-lattice magnetization of the rare-earth metal and transition metal composing the reproduction layer 6 conforms to the polarity of the sub-lattice magnetization of the rare-earth metal and transition metal composing the magnetic domain expansion layer 1 at least at temperatures in a range from room temperature to the Curie temperature of the magnetic domain expansion layer 1, the directions of sub-lattice magnetization also mutually align in the two layers.

For example, in the present embodiment 4, both the reproduction layer 6 and the magnetic domain expansion layer 1 have such composition that rare-earth metals contained in the layers show strong and overwhelming sub-lattice magnetization in the above-mentioned temperature range. This enables the rotation angles of polarized light to align to a single direction, the light being polarized by three magneto-optical effects available for use with multi-interference in the present invention, i.e., the Kerr effects of the reproduction layer 6, the Faraday effects of the reproduction layer 6, and the Kerr effects of the magnetic domain expansion layer 1; therefore, even larger rotation angles are obtainable, and reproduction signals are obtainable with a large amplitude.

As mentioned above, in the case of using a magneto-optical storage medium in accordance with the present invention, a magnetic domain, found at the front end of the beam spot, that has a temperature in a proximity of $T_{C2}$ can be expanded in the beam spot and duplicated for reproduction, enabling reproduction with reproduction signals of a large amplitude; therefore, reproduction signals can be produced with a sufficiently large amplitude without being affected by optical diffraction limit even if linear storage density is increased.

Further, since the magnetic domain expansion layer 1 is coupled with none of the magnetic layers through an exchange force in regions where the magnetic walls move, the magnetic walls readily move; that is, magnetic domains are readily expanded.

In addition, as to a magnetostatic coupling force, since the masking layer 3 suppresses the magnetic field generated by the recording layer 4, the reproduction layer 6 is acted on only by duplication magnetic fields generated by the magnetic domains expanded in the magnetic domain expansion layer 1, allowing reduction in noise from the magnetic field generated by the recording layer 4.

The following description will present results from a measurement of properties of the magneto-optical storage medium discussed in the present the embodiment 4.

A medium was fabricated as an example 4, such that the interference layer 16=70 nm, AlN; the reproduction layer 6=20 nm, GdFeCo (Curie temperature $T_{C6}$>300° C.); the transparent dielectric layer 7=20 nm, AlN: the magnetic domain expansion layer 1=30 nm, GdFeCo (Curie temperature $T_{C1}$=160° C.); the intermediate layer 2=10 nm, TbFeCo ($T_{C2}$=70° C.); the masking layer 3=20 nm, GdFeCo ($T_{C3}$=200° C.); the recording layer 4=40 nm, TbFeCo ($T_{C4}$=230° C.); and the protection layer 17=20 nm, AlN.

Results from an evaluation similar to those in the embodiments 1 and 2 show that in comparison to the comparative example 1, the example 4 increased the maximum value of C/N by about 5.5 dB, and expanded the tolerable range of reproduction power to produce a C/N ratio of 40 dB or greater by about 10%.

This is presumably for the following reasons: (1) The magnetostatic coupling between the recording layer 4 and the magnetic domain expansion layer 1 could be cut off in the example 4, whereas the coupling could not be cut off in the comparative example 1; therefore, the magnetic walls in the magnetic domain expansion layer 1 moved more smoothly in the example 4. (2) Since the magnetic domain expansion layer 1 was not necessarily made of a material that produced large magneto-optical effects even in comparison to the example 1, the Curie temperature $T_{C1}$ was not necessarily set high. In other words, such materials could be used that the frictional force due to wall coercivity was small and the magnetic walls readily moved, facilitating expansion of the magnetic domains. (3) Since the reproduction layer 6 produced great magneto-optical effects, enabled its Curie temperature $T_{C6}$ to be set high, and allowed for choices in materials of which the reproduction layer 6 was made; therefore, excellent signal properties were obtainable.

In addition, even in comparison to the example 3, reproduction signals could be obtained with a large amplitude, using multi-interference of light, by adjusting the thickness of the transparent dielectric layer 7. This is for the following reason: since the reproduction layer 6 magnetostatically coupled with the magnetic domain expansion layer 1, the magnetic domain expansion layer 1 is coupled with none of the magnetic layers through an exchange force during the motion of the magnetic walls, facilitating the movement of the magnetic walls; in other words, magnetic domains were readily expanded.

For these reasons, according to the present example 4, the maximum value of C/N rose, as well as temperature distribution conditions became somewhat less demanding in enabling the magnetic walls to move; as a result, the tolerable range of reproduction power could be expanded. That is, even higher density was achievable without changing the conditions.

Further, a reflective layer provided, on top of the arrangement, between the transparent dielectric layer 7 and the magnetic domain expansion layer 1 efficiently reflects the light that has passed through the reproduction layer 6 as described earlier in the present embodiment 4; besides, by adjusting the thickness of the transparent dielectric layer 7 so as to optimize multi-interference, more excellent signal properties are obtainable. The reflective layer is made of a material having a high reflectance: for example, Al; AlNi, AlTa, AlTi, AlCr, and other Al alloys; and Cu.

Note that the scope of the present invention is by no means restricted to the medium arrangements discussed here. For example, on top of the medium arrangement discussed in the embodiment 4, a second intermediate layer 5 may be interposed between a recording layer 4 and a masking layer 3 as discussed in the embodiment 2. The same effects as those with the embodiment 2 can be obtained in such an event.

As detailed so far, according to the present invention, a masking layer is provided between a recording layer and an intermediate layer, leak of magnetic fluxes, i.e., noise when viewed in a different perspective, that originate at the recording layer and extend to the magnetic domain expansion layer can be suppressed in regions where temperature is equal to, or exceeds, the Curie temperature of the intermediate layer, facilitating accurate and precise expansion of magnetic domains.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. A magneto-optical recording medium formed of a film and having a plurality of information tracks, each information track comprising:

in the following order, a substrate;

an interference layer;

a magnetic domain expansion layer;

a first intermediate layer;

a magnetic masking layer;

a recording layer; and a protection layer, wherein the recording layer has a plurality of storage magnetic domains;

the first intermediate layer cuts off exchange coupling with the recording layer when temperature rises past a predetermined temperature;

the magnetic domain expansion layer has magnetic walls which move toward a higher temperature portion so as to form expanded magnetic domains when the first intermediate layer cuts off the exchange coupling with the recording layer; and the magnetic masking layer is located between the recording layer and the first intermediate layer, and is coupled with the recording layer through an exchange force at temperatures that are not higher than the predetermined temperature, and meanwhile cuts off magnetostatic coupling of the magnetic domain expansion layer with the recording layer at temperatures that are higher than the predetermined temperatures.

2. A magneto-optical recording medium formed of a film and having a plurality of information tracks, each information track comprising:

in the following order;

a substrate;

an interference layer;

a first magnetic layer;

a second magnetic layer;

a third magnetic layer;

a fourth magnetic layer; and a protection layer, wherein the first magnetic layer produces a smaller frictional force due to wall coercivity than do the other magnetic layers, the second magnetic layer has a Curie temperature lower than do the other magnetic layers, the fourth magnetic layer is a perpendicular magnetization film producing a higher coercive force at room temperature than does the first magnetic layer, the third magnetic layer is provided between the second magnetic layer and the fourth magnetic layer, the third magnetic layer is in a perpendicular magnetization state at least at temperatures that are in a proximity of the Curie temperature and changes into an in-plane magnetization state at temperatures that are above the proximity of the Curie temperature, and the first, second, third, and fourth magnetic layers are mutually coupled through an exchange force.

3. The magneto-optical storage medium as set forth in claim 1, wherein the predetermined temperature is a Curie temperature of the first intermediate layer, and the magnetic masking layer exhibits perpendicular magnetization at temperatures that are in a proximity of the Curie temperature and exhibits in-plane magnetization at temperatures that are above the proximity of the Curie temperature.

4. An information reproducing method for reproducing information from a magneto-optical recording medium formed of a film and having a plurality of information tracks, each information track including in the following order, a magnetic domain expansion layer, a first intermediate layer, a magnetic masking layer, a recording layer, a protection layer, wherein the recording layer has a plurality of storage magnetic domains, the first intermediate layer cuts off exchange coupling with the recording layer when temperature rises past a predetermined temperature, the magnetic domain expansion layer has magnetic walls which move toward a higher temperature portion so as to form expanded magnetic domains when the first intermediate layer cuts off the exchange coupling with the recording layer, and the magnetic masking layer is located between the recording layer and the first intermediate layer, and is coupled with the recording layer through an exchange force at temperatures that are not higher than the predetermined temperature, and meanwhile cuts off magnetostatic coupling of the magnetic domain expansion layer with the recording layer at temperatures that are higher than the predetermined temperature, said method comprising the steps of:

rotating the medium;

projecting a light beam onto the rotating medium from the side of the magnetic domain expansion layer;

forming a temperature distribution having a gradient in the direction in which the light beam moves relative to the medium and having a region of temperatures higher than the Curie temperature of the first intermediate layer;

moving a domain wall in the magnetic domain expansion layer which comes into the region of temperatures when the medium rotates toward a side having higher temperature in the temperature gradient in the magnetic domain expansion layer; and reproducing the information by detecting rays of the light beam.

5. The magneto-optical storage medium as set forth in claim 1,
wherein the magnetic masking layer has a lower Curie temperature than does the recording layer.

6. The magneto-optical storage medium as set forth in claim 1, further comprising a second intermediate layer, located between the magnetic masking layer and the recording layer, that has a lower Curie temperature than does the recording layer.

7. The magneto-optical storage medium as set forth in claim 1, further comprising a reproduction layer, provided on a light entering side of the magnetic domain expansion layer, that is coupled with the magnetic domain expansion layer through an exchange force.

8. The magneto-optical storage medium as set forth in claim 7, further comprising a transparent dielectric layer, located between the magnetic domain expansion layer and the reproduction layer, for cutting off exchange coupling between the magnetic domain expansion layer and the reproduction layer so as to establish magnetostatic coupling between the two layers.

9. The magneto-optical storage medium as set forth in claim 7,
wherein the reproduction layer and the magnetic domain expansion layer are made of a rare-earth metal and transition metal respectively, and have the same polarity of sub-lattice magnetization of at least at temperatures ranging from room temperature to a Curie temperature of the magnetic domain expansion layer.

10. The magneto-optical storage medium as set forth in claim 8, further comprising a reflective layer provided between the transparent dielectric layer and the magnetic domain expansion layer.

11. The magneto-optical storage medium as set forth in claim 2,
wherein the third magnetic layer has a lower Curie temperature than that of the fourth magnetic layer.

12. The magneto-optical storage medium as set forth in claim 2,
wherein the third magnetic layer has a thickness in a range larger than 0 nm and not exceeding 60 nm.

13. The magneto-optical storage medium as set forth in claim 2,
wherein a fifth magnetic layer is located between the third magnetic layer and the fourth magnetic layer, a Curie temperature, $T_{c5}$, of the fifth magnetic layer being not lower than the Curie temperature, $T_{c2}$, of the second magnetic layer and not higher than the Curie temperature, $T_{c4}$, of the fourth magnetic layer.

14. The magneto-optical storage medium as set forth in claim 2,
wherein the Curie temperature, $T_{c3}$, of the third magnetic layer is higher than the Curie temperature, $T_{c4}$, of the fourth magnetic layer.

15. The magneto-optical storage medium as set forth in claim 13,
wherein the fifth magnetic layer has a thickness in a range larger than 0 nm and not exceeding 50 nm.

16. The magneto-optical storage medium as set forth in claim 13,
wherein a sixth magnetic layer is located on a light entering side of the first magnetic layer and has a Curie temperature higher than the Curie temperature, $T_{c1}$, of the first magnetic layer.

17. The magneto-optical storage medium as set forth in claim 16,
wherein the sixth magnetic layer has such magnetic properties that the sixth magnetic layer is in an inplane magnetization state in regions where the first magnetic layer has lost ordered magnetization at temperatures that exceed $T_{c1}$.

18. The magneto-optical storage medium as set forth in claim 2,
wherein the Curie temperature, $iT_{c3}$, of the third magnetic layer is higher than the Curie temperature, $T_{c1}$, of the first magnetic layer.

19. The magneto-optical storage medium as set forth in claim 16,
wherein the sub-lattice magnetization of rare-earth metal and transition metals composing the first magnetic layer and the sixth magnetic layer share a common polarity.

20. The magneto-optical storage medium as set forth in claim 16,
wherein a transparent dielectric layer is provided between the first magnetic layer and the sixth magnetic layer to block exchange coupling and establish magnetostatic coupling between the first magnetic layer and the sixth magnetic layer.

21. The magneto-optical storage medium as set forth in claim 8, wherein an interference layer is located on the light entering side of the first magnetic layer, the interference layer being made of a material that, when used together with the transparent dielectric layer, causes multi-interference of light.

22. The magneto-optical storage medium as set forth in claim 8, further comprising
a reflective layer provided between the first magnetic layer and the transparent dielectric layer.

23. An information reproducing method for reproducing information from a magneto-optical recording medium formed of a film and having a plurality of information tracks, each information track including in the following order; a first magnetic layer, a fourth magnetic layer, a third magnetic layer, a fourth magnetic layer, a protection layer, wherein the first magnetic layer produces a smaller frictional force due to wall coercivity than do the other magnetic layers, the second magnetic layer has a Curie temperature lower than do the other magnetic layers, the fourth magnetic layer is a perpendicular magnetization film producing a higher coercive force at room temperature than does the first magnetic layer, the third magnetic layer is located between the second magnetic layer and the fourth magnetic layer, the third magnetic layer is in a perpendicular magnetization state at least at temperatures that are in a proximity of the Curie temperature and changes into an in-plane magnetization state at temperatures that are above the proximity of the Curie temperature, and the first, second, third, and fourth magnetic layers are mutually coupled through an exchange force, said method comprising the steps of:
rotating the medium;
projecting a light beam onto the rotating medium from the side of the first magnetic layer;
forming a temperature distribution having a gradient in the direction in which the light beam moves relative to the medium and having a region of temperatures higher than the Curie temperature of the second magnetic layer;
moving a domain wall in the first magnetic layer which comes into the region of temperatures when the medium rotates toward a side having higher temperature in the temperature gradient in the first magnetic layer; and
reproducing the information by detecting rays of the light beam.

24. An information reproducing apparatus for reproducing information from a magneto-optical recording medium formed of a film and having a plurality of information tracks, each information track including in the following order, a magnetic domain expansion layer, a first intermediate layer, a magnetic masking layer, a recording layer, a protection layer, wherein the recording layer has a plurality of storage magnetic domains, the first intermediate layer cuts off exchange coupling with the recording layer when temperature rises past a predetermined temperature, the magnetic domain expansion layer has magnetic walls which move toward a higher temperature portion so as to form expanded magnetic domains when the first intermediate layer cuts off the exchange coupling with the recording layer, and the magnetic masking layer is located between the recording layer and the first intermediate layer, and is coupled with the recording layer through an exchange force at temperatures that are not higher than the predetermined temperature, and meanwhile cuts off magnetostatic coupling of the magnetic domain expansion layer with the recording layer at temperatures that are higher than the predetermined temperature, said apparatus comprising:

means for rotating the medium;
means for projecting a light beam onto the rotating medium from the side of the magnetic domain expansion layer;
means for forming a temperature distribution having a gradient in the direction in which the light beam moves relative to the medium and having a region of temperatures higher than the Curie temperature of the first intermediate layer;
means for moving a domain wall in the magnetic domain expansion layer which comes into the region of temperatures when the medium rotates toward a side having higher temperatures in the temperature gradient in the magnetic domain expansion layer; and
means for reproducing the information by detecting rays of the light beam; and
heating means for heating the medium and forming the temperature distribution, said heating means being provided separately from the light beam projecting means.

25. An information reproducing apparatus for reproducing information from a magneto-optical recording medium formed of a film and having a plurality of information tracks, each information track including in the following order; a first magnetic layer, a second magnetic layer, a third magnetic layer, a fourth magnetic layer, a protection layer, wherein the first magnetic layer produces a smaller frictional force due to wall coercivity than do the other magnetic layers, the second magnetic layer has a Curie temperature lower than do the other magnetic layers, the fourth magnetic layer is a perpendicular magnetization film producing a higher coercive force at room temperature than does the first magnetic layer, the third magnetic layer is located between the second magnetic layer and the fourth magnetic layer, the third magnetic layer is in a perpendicular magnetization state at least at temperatures that are in a proximity of the Curie temperatures and changes into an in-plane magnetization state at temperatures that are above the proximity of the Curie temperature, and the first, second, third, and fourth magnetic layers are mutually coupled through an exchange force, said apparatus comprising:

means for rotating the medium;
means for projecting a light beam onto the rotating medium from the side of the first magnetic layer;
means for forming a temperature distribution having a gradient in the direction in which the light beam moves relative to the medium and having a region of temperature higher than the Curie temperature of the second magnetic layer;
means for moving a domain wall in the first magnetic layer which comes into the region of temperatures when the medium rotates toward a side having higher temperature in the temperature gradient in the first magnetic layer; and
means for reproducing the information by detecting rays of the light beam; and
heating means for heating the medium and forming the temperature distribution, said heating means being provided separately from said light beam projecting means.

26. The magneto-optical storage medium as set forth in claim 8,
wherein the reproduction layer and the magnetic domain expansion layer are made of a rare-earth metal and transition metal respectively, and have the same polarity of sub-lattice magnetization of at least at temperatures ranging from room temperature to a Curie temperature of the magnetic domain expansion layer.

27. The magneto-optical storage medium as set forth in claim 9, further comprising a reflective layer provided between the transparent dielectric layer and the magnetic domain expansion layer.

* * * * *